(12) United States Patent
Hasegawa et al.

(10) Patent No.: US 6,219,180 B1
(45) Date of Patent: Apr. 17, 2001

(54) OPTICAL UNIT SWITCHING APPARATUS

(75) Inventors: Kazuhiro Hasegawa, Hachioji (JP); William K. Fester, Melville, NY (US)

(73) Assignees: Olympus America, Inc., Melville, NY (US); Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/290,823

(22) Filed: Apr. 13, 1999

(51) Int. Cl.[7] .................................................. G02B 21/06
(52) U.S. Cl. ........................ 359/387; 359/368; 359/381; 359/383
(58) Field of Search ........................... 359/363, 368–390, 359/819–822, 827, 830

(56) References Cited

U.S. PATENT DOCUMENTS

| | | | |
|---|---|---|---|
| 4,407,569 | * | 10/1983 | Piller et al. ............................ 359/387 |
| 4,653,878 | * | 3/1987 | Nakasato et al. ...................... 359/383 |
| 5,128,808 | * | 7/1992 | Dosaka ................................. 359/381 |

FOREIGN PATENT DOCUMENTS

| | | | |
|---|---|---|---|
| 2055944 | * | 5/1972 | (DE) ..................................... 359/388 |
| 2-107109 | | 8/1990 | (JP) . |
| 8-338947 | | 12/1996 | (JP) . |

OTHER PUBLICATIONS

English abstract of Japanese reference No. 8–338,947.

* cited by examiner

Primary Examiner—Thong Nguyen
(74) Attorney, Agent, or Firm—Scully, Scott, Murphy & Presser

(57) ABSTRACT

An optical unit switching apparatus having a type-display section for displaying types of all optical units mounted on a movable member for switching and moving the optical units; and indicators arranged corresponding to respective mounting positions for the optical units for indicating a type of the optical unit inserted into an optical path. Since these indicators are located at different positions with respect to the centers of the corresponding mounting positions for the optical units, the indicators point at different positions in the type-display section when switching operations are performed. Accordingly, the type of the optical unit presently inserted into the optical path can be recognized by printing the names and the like of the respective optical units at the positions pointed at by the indicators corresponding to the respective optical units.

24 Claims, 19 Drawing Sheets

OPTICAL UNIT SWITCHING APPARATUS

BACKGROUND OF THE INVENTION

1. Field of the Invention

This invention relates to an optical unit switching apparatus for use in optical devices, such as fluorescence microscopes or phase contrast microscopes, in which optical units are switched from one type to another.

2. Description of the Related Art

In fluorescence microscopes, in general, light of a particular wavelength range as excitation light is applied to a sample, and fluorescence emitted from the sample and having a longer wavelength than the excitation light is observed. The structure of a fluorescence microscope will be described with reference to FIG. 1. Light emitted from a light source 18 advances on an optical path 16, and only a light component of a wavelength selected by an excitation filter 17 is passed therethrough.

The passed light is reflected to a microscope optical path 13 by a dichroic mirror 12 which has a characteristic for reflecting light of a short wavelength and passing light of a long wavelength. The reflected light excites a sample 15 through an objective lens 14, whereby fluorescence is emitted from the sample 15. The fluorescence passes the objective lens 14 and then the dichroic mirror 12. Extra excitation light is absorbed by a barrier filter 11, and only the fluorescence is converged on a plane 10 and observed. In general, the excitation filter 17, the dichroic mirror 12, and the barrier filter 11 are combined as a filter cassette 19. Such a filter cassette is prepared for each of reagents with different properties and selected by an optical unit switching apparatus in accordance with the purpose of observation.

Further, phase contrast microscopes are used to observe a sample which cannot be observed by bright field observation when there is no clear contrast in color or concentration between the sample and the ambience. Specifically, these microscopes convert phase information of the sample to an intensity difference, using light interference. The structure of a phase contrast microscope will be explained with reference to FIG. 2. At the front focus of a condenser lens 23, a ring slit 24 is formed to be annular with respect to an optical path 13 of the microscope. Light having passed the ring slit 24 illuminates a sample 22, and then converges on a phase ring 20 provided on the rear focal plane of an objective lens 21.

Light having passed the phase ring 20, whose phase is varied by a ¼ wavelength, reaches a primary image plane 25. Further, light diffracted by the sample converges on the primary image plane 25 without being influenced by the phase ring 20, since it is distributed on the entire rear focal plane of the objective lens 21. Therefore, the light diffracted by the sample and the light having passed the phase ring 20, having a phase difference of ¼ wavelength between them, interferes with each other, and the interference is observed as an intensity difference. Since the size of the ring slit 24 is determined from the numerical aperture of the objective lens 21, the ring slit member is selected in accordance with the type of the objective lens 21. The ring slit member is switched from one to another by means of an optical unit switching apparatus incorporated in the condenser. Accordingly, the conventional optical unit switching apparatus requires means for displaying the type of the optical unit mounted.

For example, in Japanese Utility Model Application KOKAI Publication No. 2-107109 (see FIG. 3), a type display member 47 indicates the types of optical units mounted on an optical unit switching apparatus main body 46, and a recess 48 is formed in the main body 46. One of the type display member 47 and the recess 48 is made of a magnet, and the other is made of a magnetic body. Therefore, the type display member 47 can easily be switched corresponding to the mounting and dismounting of the optical units. This means that the type of the optical unit presently positioned on the optical path 13, and the position of the optical unit to be used after switching can be recognized by relating the contents of a movable position display 45 indicative of an optical unit presently positioned on the optical path 13, to the contents of the type display member 47. From these two displays, however, the type of the optical unit presently positioned on the optical path 13, and the position of the optical unit to be used after switching cannot directly be recognized. In light of this, in Japanese Patent Application KOKAI Publication No. 8-338947 (see FIG. 4), a display portion 28a–28d is provided in front of each filter cassette, which is an optical unit. The display portion 28a–28d indicates the type of a filter incorporated in the filter cassette. In an operation surface of a fluorescent apparatus main body 26, apertures 27a–27g are formed such that the display portion 28a–28d can be exposed through the apertures 27a–27g in every position within a range in which a mountable filter cassette is movable. Accordingly, the display portions 28a–28d of all the mounted filter cassettes can be exposed through the apertures 27a–27g simply by mounting the filter cassettes in the fluorescent apparatus main body 26, so that the type of a filter cassette positioned in the microscope optical path 13, and the position of any other filter cassette to be used after switching can be recognized from one display. This means that the direction for the switching operation and the feeding amount can be directly recognized.

However, in a conventional fluorescence microscope using a light source of high luminance, leakage of light through the apertures is harmful. Thus, providing a fluorescence microscope with multiple apertures which are free from leakage of light inevitably complicates its structure. Further, such a switching mechanism is not applicable to a rotary type mechanism which is simple in structure and used in many optical unit switching apparatuses.

SUMMARY OF THE INVENTION

The present invention has been made in light of the above circumstances. An object of the present invention is to provide an optical unit switching apparatus of a simple structure, in which the types of all optical units presently mounted are displayed so as to enable, from one display, direct recognition of the type of an optical unit presently positioned in the optical path, and the position of another optical unit to be used after switching, thereby enhancing its operability.

In order to attain the above object, an optical unit switching apparatus of the present invention for switching a plurality of optical units in an optical device comprises a movable member having mounting positions for mounting the plurality of optical units; a main body for movably supporting the movable member in order to selectively insert one of the plurality of optical units into an optical path of the optical device and remove the one optical unit from the optical path; a positioning mechanism for positioning the movable member so as to align one of the plurality of optical units with the optical path; a type-display section for displaying types of the plurality of optical units; and a plurality of indicators arranged corresponding to the respective mounting positions of the movable member for indicating a type of one of the plurality of optical units inserted into the optical path, respective positions of the plurality of indicators with respect to centers of the corresponding mounting positions being different from each other.

Since these indicators are located at different positions with respect to the centers of the corresponding mounting positions for the optical units, the indicators point at different positions in the type-display section when switching operations are performed. Accordingly, the type of the optical unit presently inserted into the optical path can be recognized by printing, or arranging members with prints of, the names and the like of the respective optical units at the positions pointed at by the indicators corresponding to the respective optical units.

BRIEF DESCRIPTION OF THE DRAWINGS

FIG. 20(*b*) is a sectional view as viewed along line 20*b*—20*b* in FIG. 20(*a*).

DETAILED DESCRIPTION OF THE PREFERRED EMBODIMENTS

Figure 1:
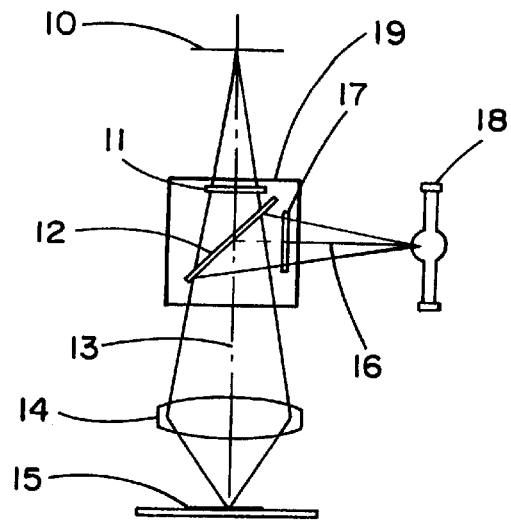
FIG. 1 is a schematic view for explaining the optical structure of a fluorescence microscope.

Referring to the drawings, a first embodiment of the present invention will be described.

Figure 2:
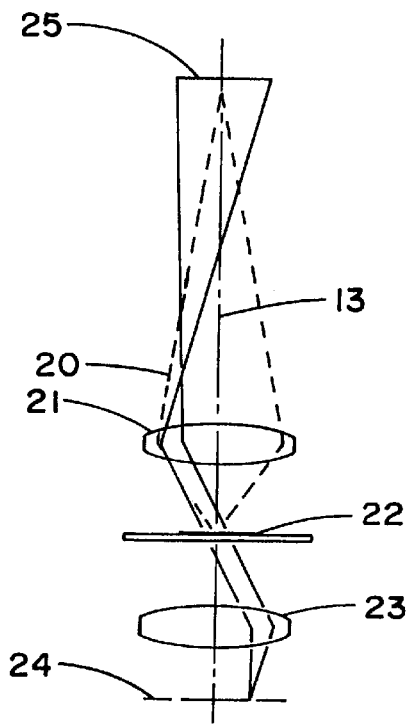
FIG. 2 is a schematic view for explaining the optical structure of a phase contrast microscope.
Figure 3:
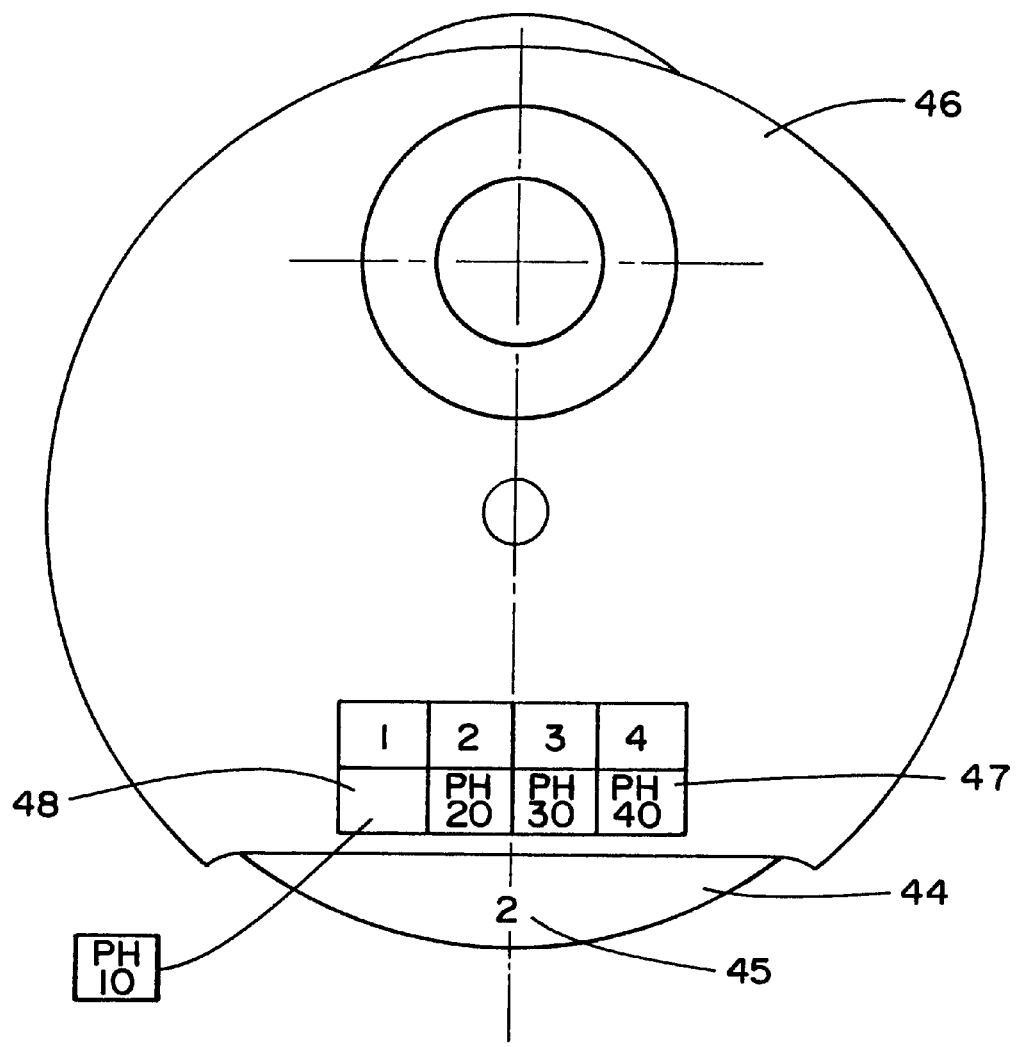
FIG. 3 is a view showing the structure of a conventional optical unit switching apparatus.
Figure 4:
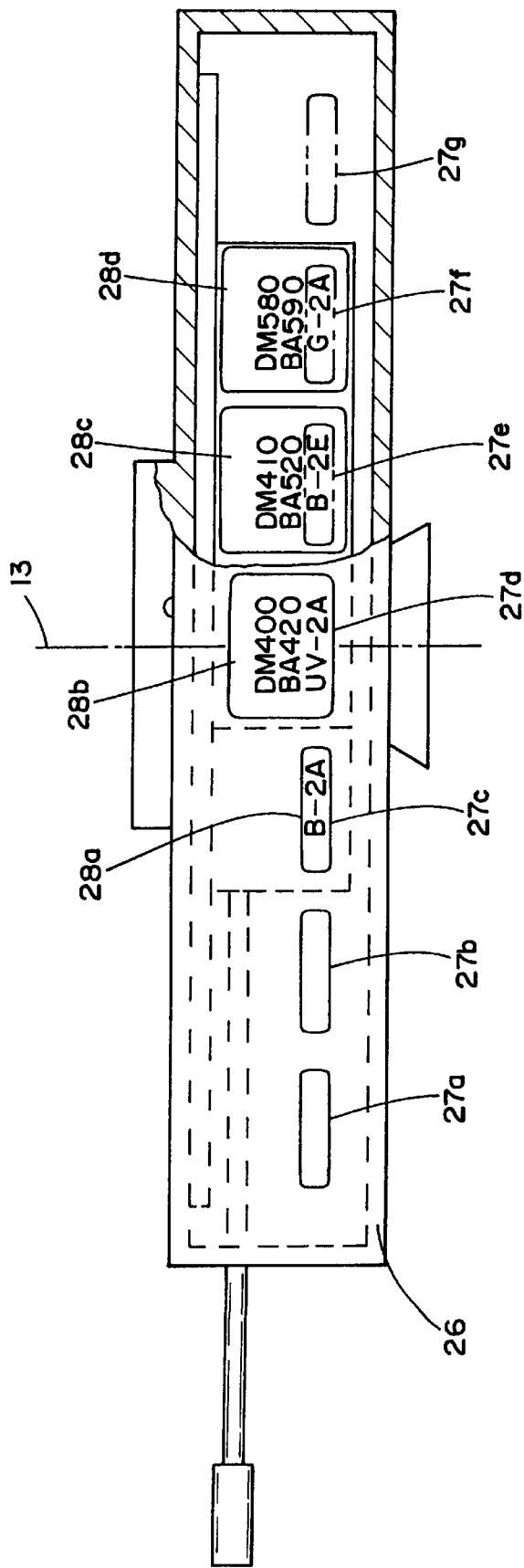
FIG. 4 is a view showing the structure of another conventional optical unit switching apparatus.
Figure 5:
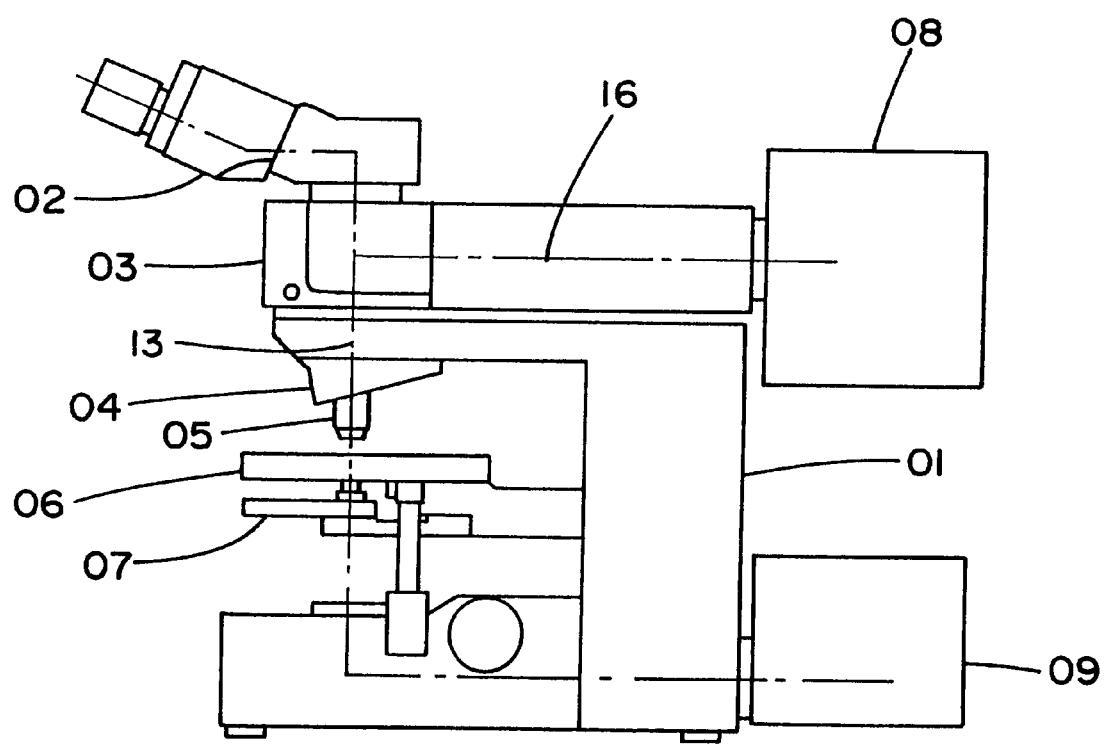
FIG. 5 is a side view showing the entire structure of a microscope to which the present invention is applied.
Figure 6:
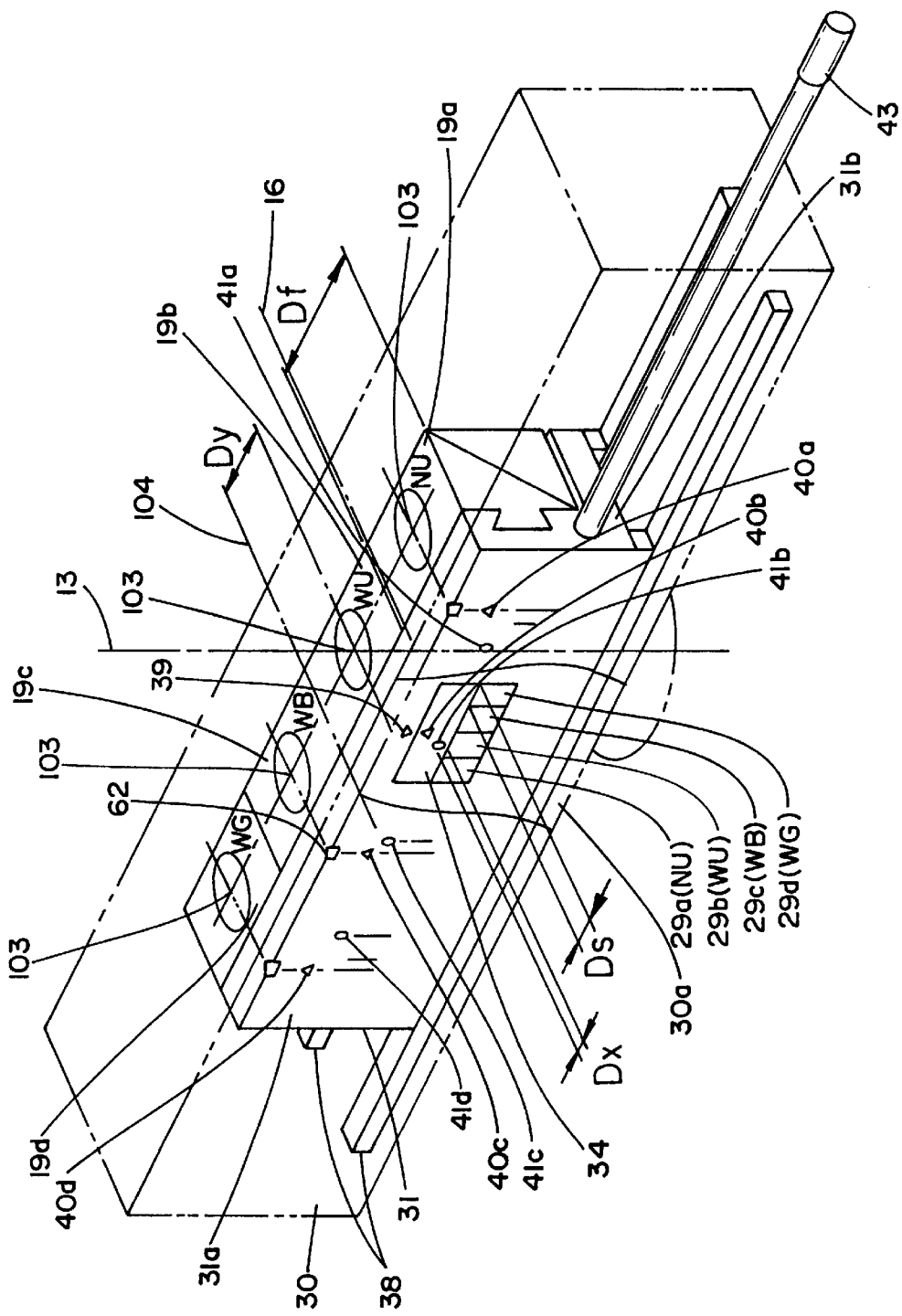
FIG. 6 is a perspective view of a first embodiment of the present invention.

FIG. 5 shows an example of the structure of a microscope to which the present invention is applicable. A microscope main body 01 is provided with a lens-barrel 02 with an eye-piece; a reflected light source 08 for illuminating a sample with reflected illumination; and a reflected-illumination projection tube 03 which has a rectilinearly-movable member 31 (FIG. 6). A plurality of filter cassettes are mounted on the rectilinearly-movable member 31 and can be inserted into an optical axis 13 of the microscope. The microscope main body 01 is also provided with a revolver 04 having a plurality of objective lenses 05 and capable of switching the insertion of the lenses 05 into the optical path 13 of the microscope; a stage 06 for supporting the sample and capable of shifting the position of the sample with respect to the optical path 13 of the microscope; a transmitted light source 09 for transmitted illumination; and a condenser 07 provided for converging, onto the sample, light from the transmitted light source 09. The condenser 07 has a position for attaching a ring slit 24 (see FIG. 2) for phase contrast observation, which position is conjugate with the back focal point of the objective lens 05.

Figure 7:
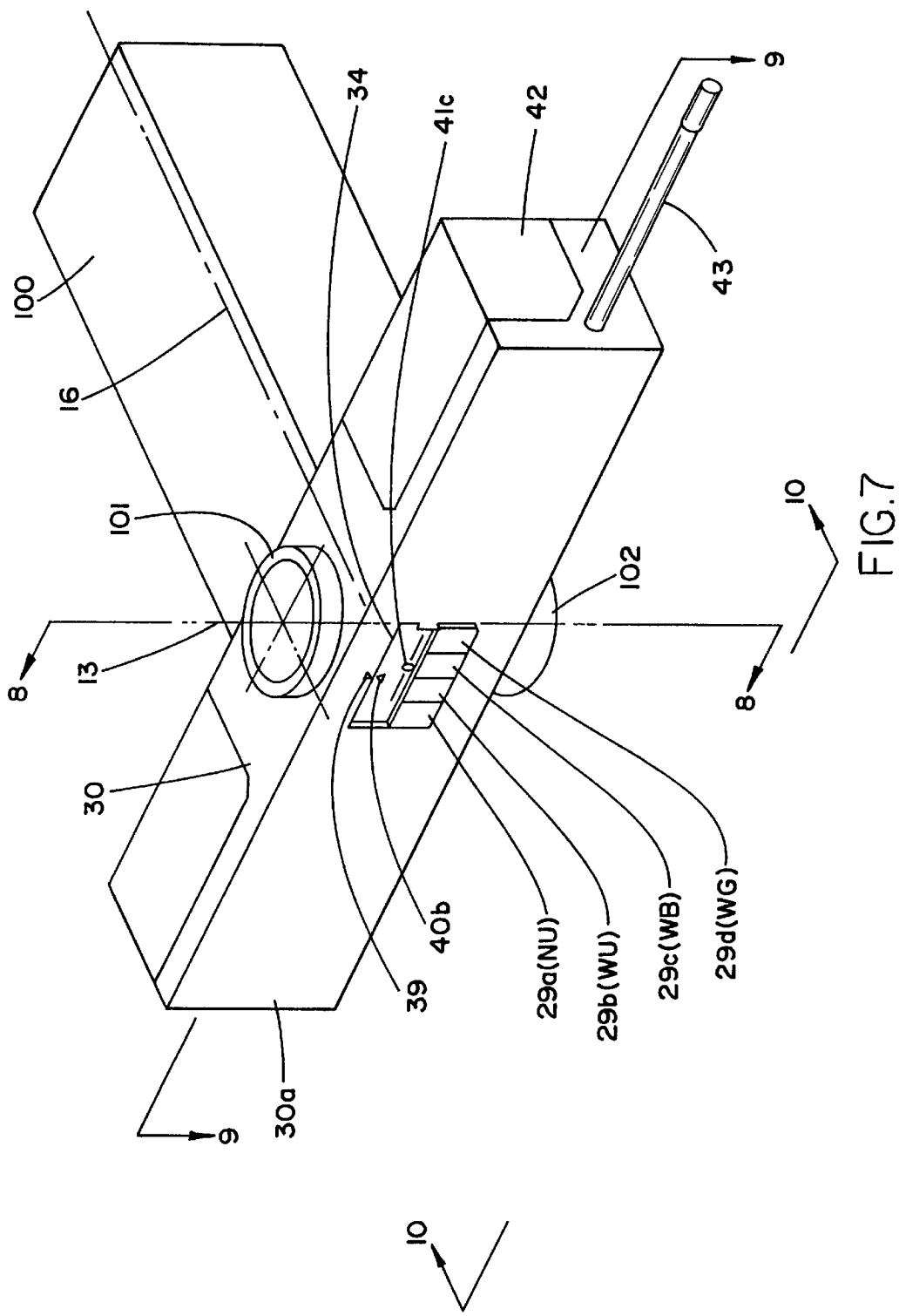
FIG. 7 is a perspective view of a reflected-illumination projection tube of the first embodiment.
Figure 8:
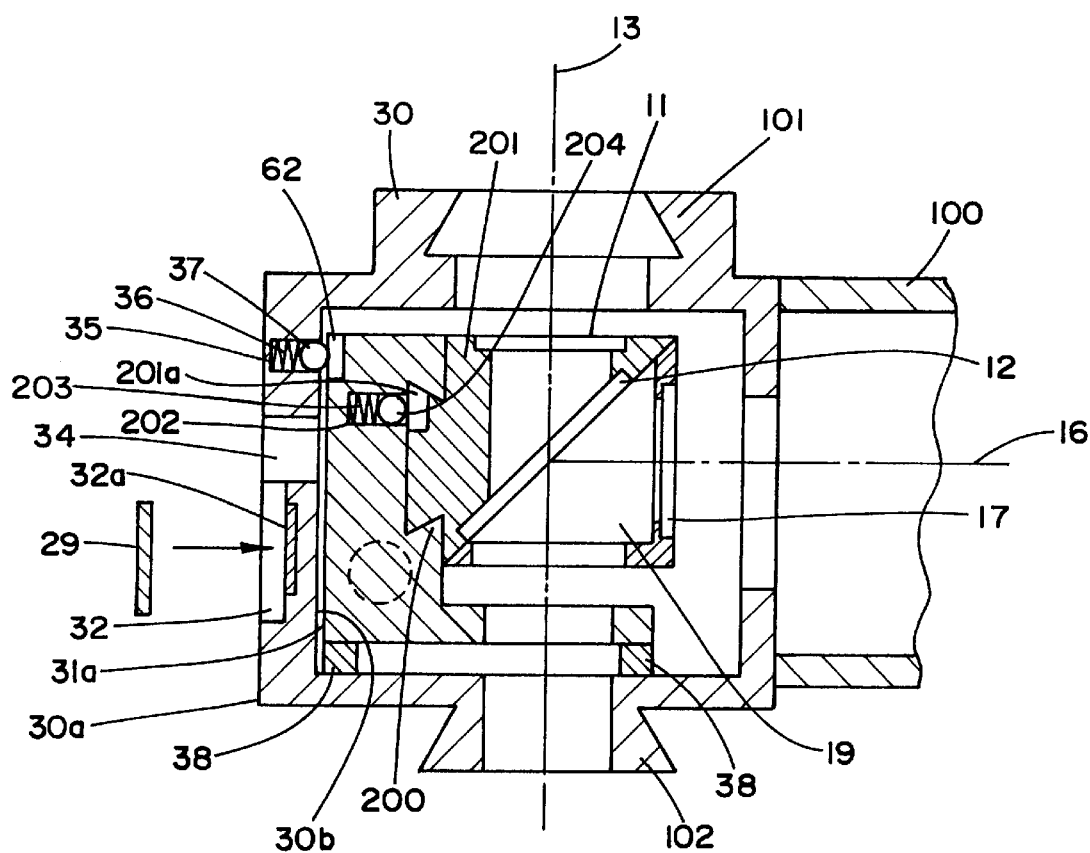
FIG. 8 is a sectional view taken along line 8—8 in FIG. 7.

An optical unit switching apparatus according to the present invention, adapted to the reflected-illumination projection tube 03, will be described with reference to FIGS. 6, 7, and 8. FIG. 6 is a perspective view showing the relationship between the interior of the device and a display section thereof. FIG. 7 shows an outward appearance of the reflected-illumination projection tube 03. FIG. 8 is a sectional view as taken along line 8—8 in FIG. 7.

The reflected-illumination projection tube 03 comprises a container 30 for containing filter cassettes 19*a*–19*d*, and a projection tube section 100 containing lenses. The container 30 has a female dovetail 101 and a male dovetail 102 provided on its upper and bottom surfaces, respectively, such that the axes of the dovetails are aligned with each other. The reflected-illumination projection tube 03 is attached to the microscope main body 01, using the male dovetail 102 of the bottom surface. The lens-barrel 02 is attached to the female dovetail 101 of the upper surface. When the projection tube 03 is attached to the microscope main body 01, the axes of the dovetails are aligned with the optical axis 13 of the microscope.

The reflected light source 08, which contains a lamp such as a mercury lamp or a Xenon lamp, is attached to an end portion of the projection tube section 100.

At a position where the optical axis 16 of the reflected light source 08 intersects the optical axis 13 of the microscope, the projection tube section 100 is attached to a surface of the container 30 which is opposite to its operation surface 30*a*.

Linear guides 38 and a movable member 31 are provided in the container 30. The movable member 31 is supported by the guides 38 so as to be movable in a direction perpendicular to each of the optical axes 13 and 16. An operation handle 43 having an axis extending parallel to the movement direction of the movable member 31 is attached to a surface 31*b* of the movable member 31 which is perpendicular to the movement direction thereof. The operation handle 43 enables switching of the filter cassettes 19*a*–19*d* from the outside of the reflected-illumination projection tube 03. The movable member 31 has a female dovetail 200 to be engaged with a male dovetail 201 of each filter cassette 19*a*–19*d*. Preferably four filter cassettes 19*a*–19*d* are attached to the movable member 31 when it is exposed by removing a lid 42.

Figure 22:
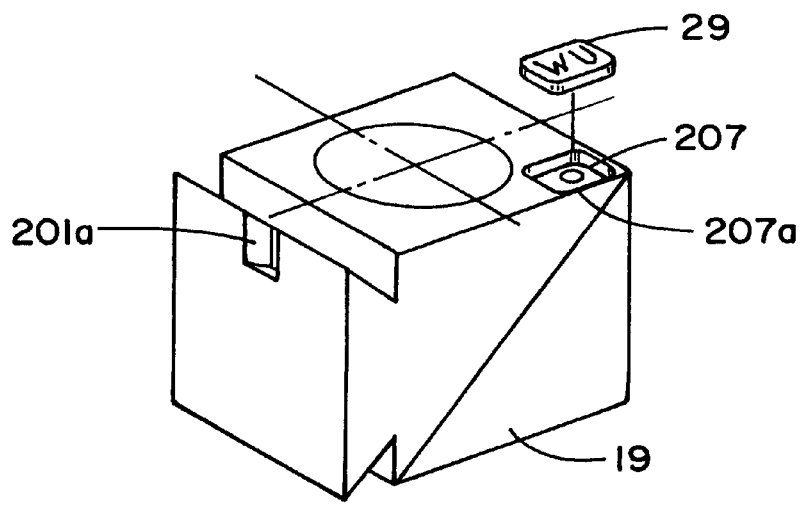
FIG. 22 is a view of a modified optical unit.

Referring to FIGS. 8 and 22, the attaching structure of the filter cassette 19 is further described. The male dovetail 201 of the filter cassette 19 is provided with a V-shaped groove 201a. The female dovetail 200 of the movable member 31 is provided with four holes 202, each of which contains a spring 203 and a ball 204.

When the male dovetail 201 of the filter cassette 19 is inserted into the female dovetail 200 of the moving member 31, the male dovetail 201 is pushed by the ball 204 and inclined surfaces of the male dovetail 201 contact with inclined surfaces of the female dovetail 200 so that the filter cassette 19 is held without wobbling. Further, the filter cassette 19 is correctly positioned in the direction of insertion of the male dovetail 201 when the ball 204 falls in the V-shaped groove 201a.

With this structure, desired filter cassettes 19 can be attached to the movable member 31 in desired order. Moreover, the filter cassettes 19 can be freely exchanged or rearranged to meet the needs of observation.

Figure 9:
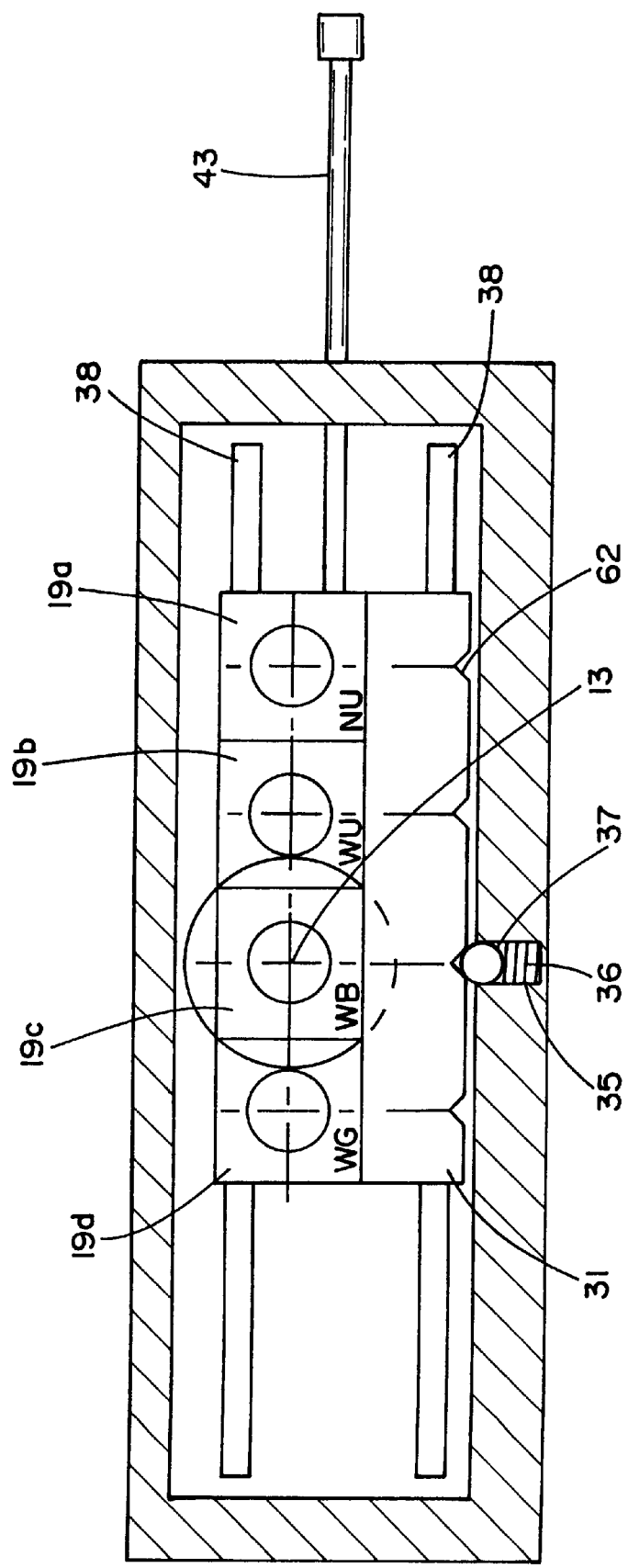
FIG. 9 is a sectional view taken along line 9—9 in FIG. 7.

Referring now to FIG. 9, there is illustrated a sectional view taken along line 9—9 in FIG. 7.

Four V-grooves 62 each having a V-shaped cross section are formed in a wall surface 31a of the movable member 31 in a direction parallel to the movement direction of the movable member 31. The V-grooves 62 are formed corresponding to respective center lines 103 of the four filter cassettes 19a–19d attached to the movable member 31.

A hole 35, which is preferably not a through hole, is formed in an inner wall 30b of the container 30 from the inside. The position of the hole 35 as viewed from the operation surface 30a coincides with the optical axis 13 and is within a range in which the V-grooves 62 pass as the movable member 31 moves. A compression spring 36 and a ball 37 are received in the hole 35. The V-grooves 62, the spring 36 and the ball 37 act as a positioning mechanism and is hereinafter referred to as a click mechanism. Someone skilled in the art would recognize that other positioning means known in the art can be substituted for the click mechanism without departing from the spirit or scope of the present invention.

An inner wall 30b of the container 30 is designed to be adjacent to the wall surface 31a of the movable member 31 such that the wall surface 31a is normally urged by the ball 37. Where the center of each V-groove 62 is aligned with the center of the hole 35 as a result of the movement of the movable member 31, the spring 36 expands to its maximum, and hence the movable member 31 stabilizes. In other words, in four positions where the center line 103 of each of the filter cassettes 19a–19d is aligned with the optical axis 13, the movable member 31 is correctly positioned.

In the following description concerning the positional relationship between various elements, the direction along the optical axis 13 will be referred to as a "vertical direction", the main body 01 side of the microscope as a "lower side", and the lens-barrel 02 side of the microscope as an "upper side". Moreover, the movement direction of the movable member 31 is referred to as a "horizontal direction", and the operation handle 43 side of the container 30 as a "right side".

Figure 10:
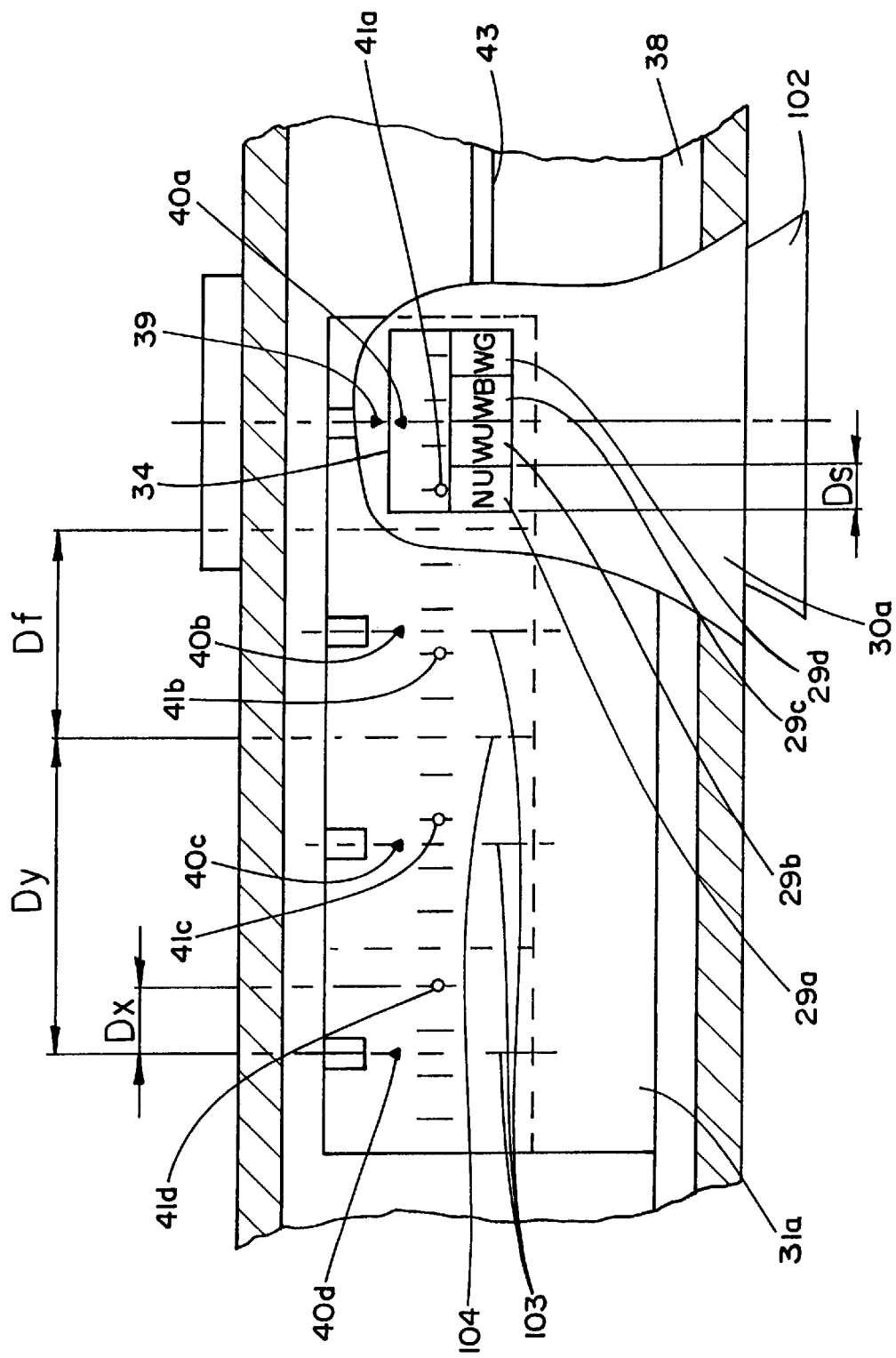
FIG. 10 is a partial sectional view as viewed along line 10—10 in FIG. 7.

Referring now to FIG. 10 there is illustrated a partial sectional view as viewed along line 10—10 in FIG. 7.

A rectangular opening 34 is formed in the operation surface 30a. The position of the center of the upper edge of the opening 34 in the horizontal direction is such that the center is aligned with the optical axis 13. The size of the opening 34 is determined such that two kinds of indicators (position indicators 40a–40d and type indicators 41a–41d) printed on the movable member 31 are exposed vertically, and four type-display members 29a–29d are exposed horizontally.

A fixed indicator 39 is provided over the center of the upper edge of the opening 34 of the operation surface 30a. Type-display members 29a–29d are provided to display the types of the filter cassettes 19a–19d presently attached to the movable member 31. For example, one of the type-display members which corresponds to a filter cassette 19a for exciting a narrow-band U has an abbreviation, NU, printed thereon, while one of the type-display members which corresponds to a filter cassette 19d for exciting a wide-band G has an abbreviation, WG, printed thereon. A recess 32 with a size corresponding to the total width of the horizontally arranged four type-display members 29a–29d is formed below the opening 34. The type-display members 29a–29d can be easily attached to the recess 32 by forming one of the recess 32 and each type-display member 29a–29d of a magnet and the other of a magnetic member. In this embodiment, a magnet 32a is embedded in the bottom of the recess 32 and each type-display member 29a–29d is formed of a magnetic member.

First, a type-display member 29a corresponding to a rightmost filter cassette 19a on the movable member 31 is attached to a leftmost area of the recess 32. Then, a type-display member 29b corresponding to a second filter cassette 19b from the right on the movable member 31 is attached to a second area of the recess 32 from the left. Similarly, the other type-display members 29c and 29d corresponding to the other filter cassettes 19c and 19d are attached to the recess 32.

The two kinds of indicators, the position indicators 40a–40d and the type indicators 41a–41d on the movable member 31, will now be described.

The number of the position indicators 40a–40d is four in the preferred implementation of the present invention. In the vertical direction, the position indicators 40a–40d are located so as to appear in an upper position inside the opening 34. In the horizontal direction, the position indicators 40a–40d are located so as to align with the center lines 103 of the respective filter cassettes 19a–19d.

The number of the type indicators 41a–41d is also preferably four. In the vertical direction, the type indicators 41a–41d are located so as to appear in a lower position inside the opening 34. In the horizontal direction, each of the type indicators 41a–41d is displaced by a distance Dx from the center line 103 of the corresponding filter cassette 19a–19d. The distance Dx is given by $$Dx = (Dy/Df) \times Ds$$

where Ds is the width of each type-display member 29a–29d, Df is the width of each filter cassette 19a–19d, and Dy is the distance between the center line 103 of the corresponding filter cassette 19a–19d and the center line 104 of all the four filter cassettes 19a–19d (assuming that the right side of each filter cassette 19a–19d from its center line 103 is the "+" side, and the left side of it is the "−" side).

For example, if the width Df of the filter cassette 19a–19d is 10, the width Ds of the type-display member 29a–29d is 2, and the distance Dy between the filter cassette 19a and the center line 104 of the four filter cassettes 19a–19d is −15, then the value of Dx can be obtained as follows:

$$Dx = (-15/10) \times 2 = -3$$

Thus, the position of each of the four type indicators 29a–29d from the center line 104 of all the four filter cassettes 19a–19d can be determined by substituting the distance between the center line 103 of the corresponding filter cassettes 19a–19d and the center line 104.

In operation, each of the filter cassettes 19a–19d can be aligned with the optical axis 13 by pushing or pulling the operation handle 43. Where one of the filter cassettes 19a–19d is aligned with the optical axis 13, the corresponding position indicator 40a–40d and type indicator 41a–41d of the movable member 31 can be seen through the opening 34. This position indicator 40a–40d is aligned with the fixed indicator 39, and the type indicator 41a–41d is aligned with the corresponding type-display member 29a–29d. For example, in the FIG. 10 case where the rightmost filter cassette 19a is aligned with the optical axis 13, the type indicator 41a is aligned with the leftmost type-display member 29a.

Thus, the filter cassette 19a which is now aligned with the optical axis 13 is determined. For example, if the NU filter cassette 29a should be switched to the WG filter cassette 19d, it can be recognized, from the positional relationship between the type-display member 29a presently pointed at by the type indicator 41a, and the targeted type-display member 29d, that the movable member 31 should be moved to the right side by three filter cassettes, using the operation handle 43.

Figure 11:
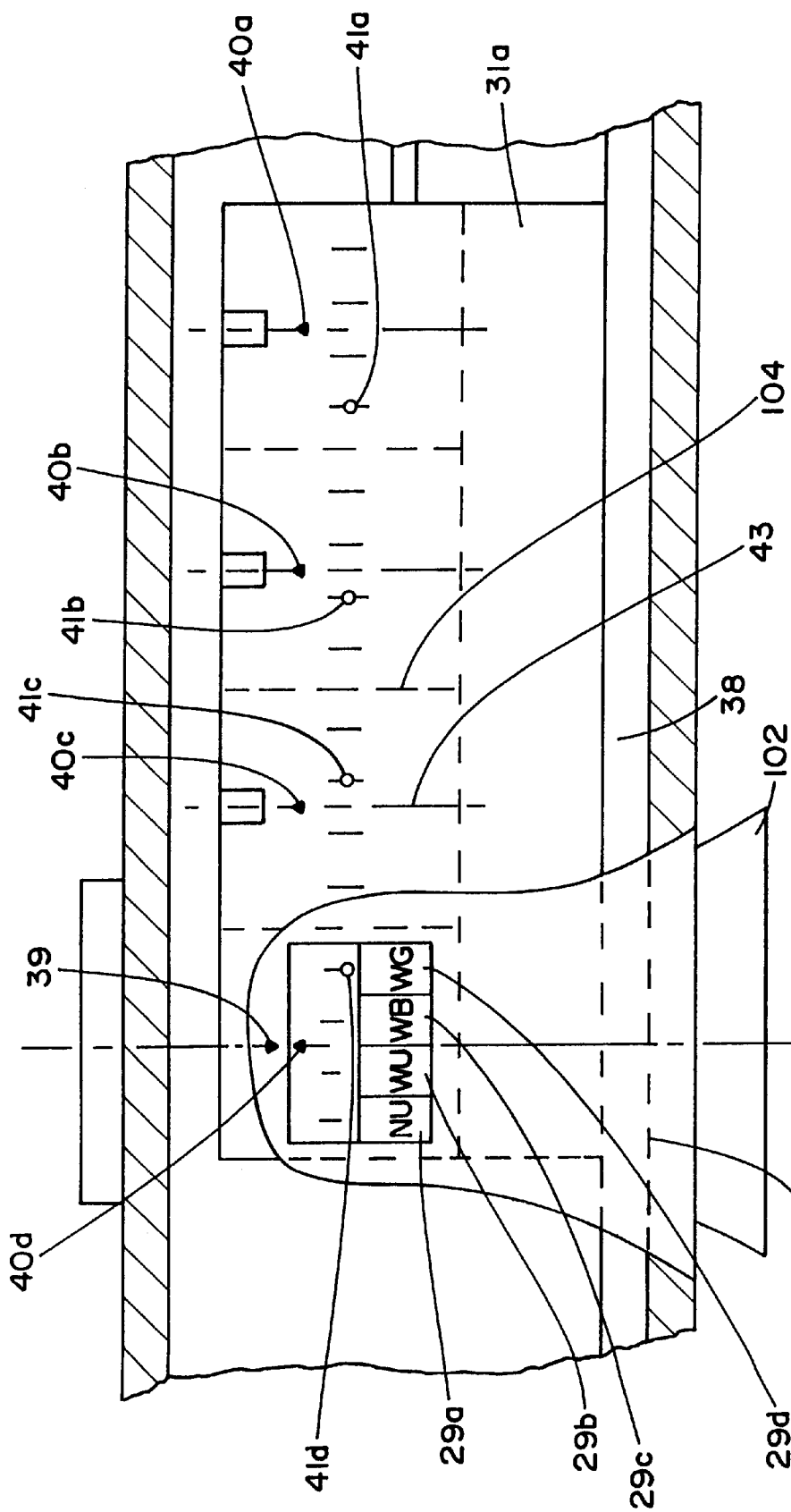
FIG. 11 a view showing the state in which switching to an optical unit WG has been finished.
Figure 12:
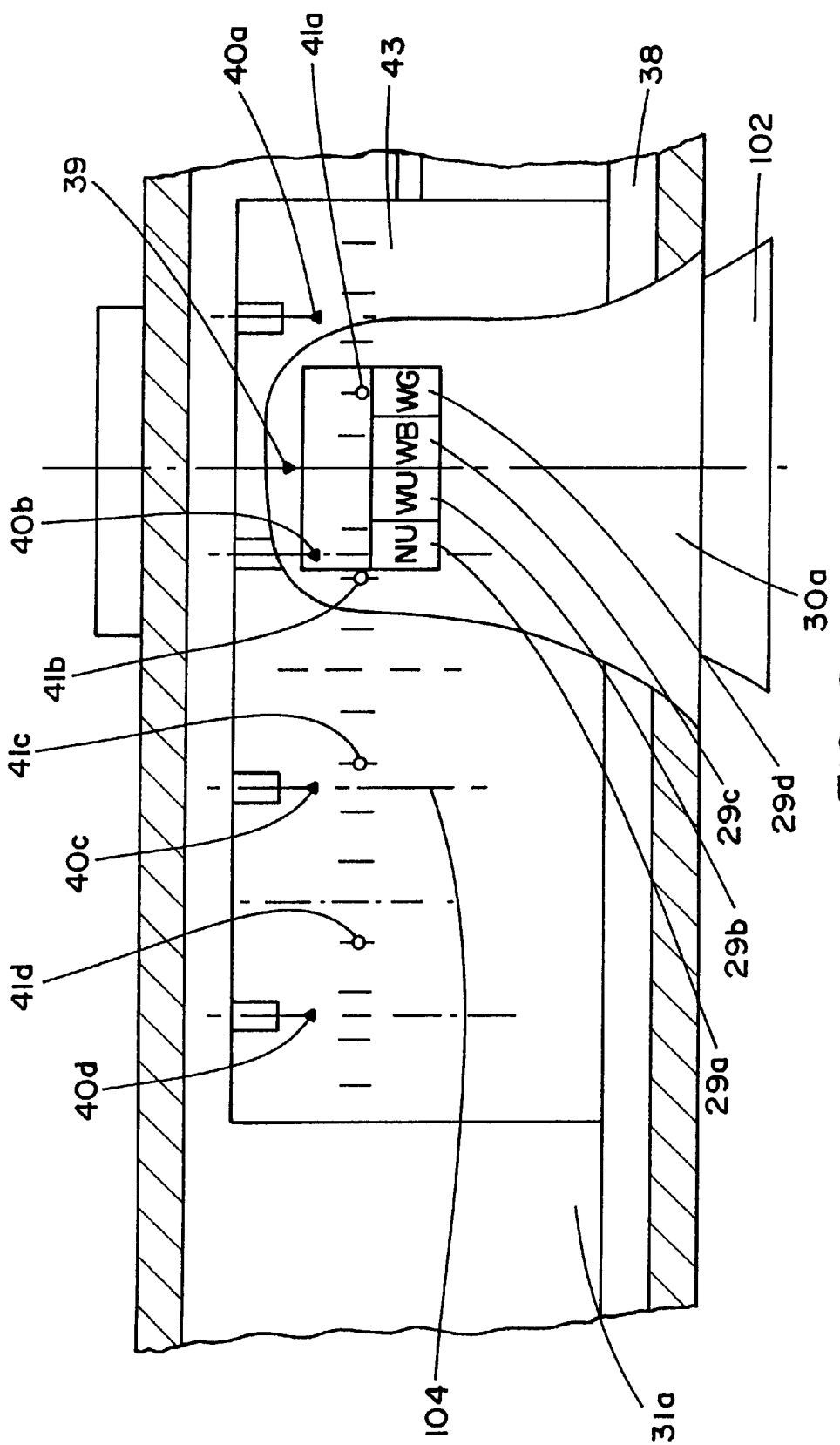
FIG. 12 a view showing a state in which switching to an optical unit is being performed.

FIG. 10 shows the state before the switching, whereas FIG. 11 shows the state after the switching. Further, FIG. 12 shows a state during the switching, in which the position indicator 40b is not aligned with the fixed indicator 39 although the type indicator 41a is aligned with the type-display member WG 29d, which means that no filter cassette is presently aligned with the optical axis 13, i.e. that the switching operation is now being performed.

In the rectilinearly-movable optical unit switching apparatus constructed as above, only one display section enables recognition of the types of all optical units mounted, the type of that one of the optical units which is now positioned on the optical path, and the direction and amount of movement of a member for switching the optical units from one to another. Thus, the optical unit switching apparatus is highly operable. Moreover, in the projection tube of a reflected-illumination fluorescent microscope which requires a highly illuminant light source, the optical unit switching apparatus can minimize the leakage of light since it has only one opening. In addition, since the optical unit switching apparatus has only one opening and is constituted by a small number of structural elements, it can be manufactured at low cost.

Figure 13:
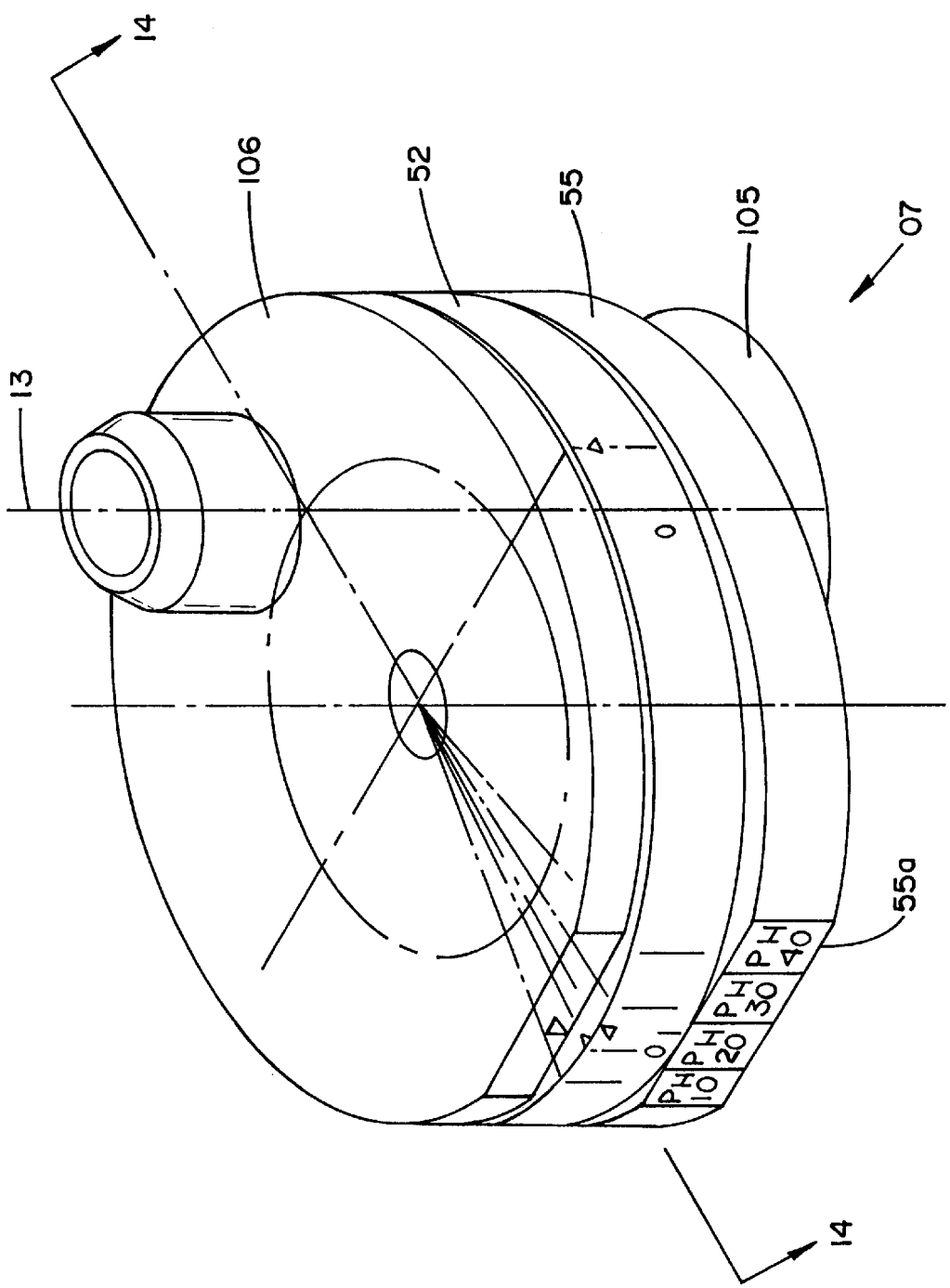
FIG. 13 is a view showing an outward appearance of a second embodiment of the present invention.

Next, an optical unit switching apparatus according to a second embodiment of the present invention, adapted to a rotatable condenser 07 will be described with reference to FIGS. 13, 14, and 15. Ring slits 24a–24d for use in a phase contrast microscope can be attached to the rotatable condenser 07. FIG. 13 shows the outward appearance of the condenser 07. The condenser 07 is fixed to the microscope main body 01 (see FIG. 5), with a male dovetail 105 in the rear part of its bottom section 55. When it is fixed on the main body 01, the axis of the male dovetail 105 of the condenser 07 is aligned with an optical axis 13 of the microscope.

Figure 14:
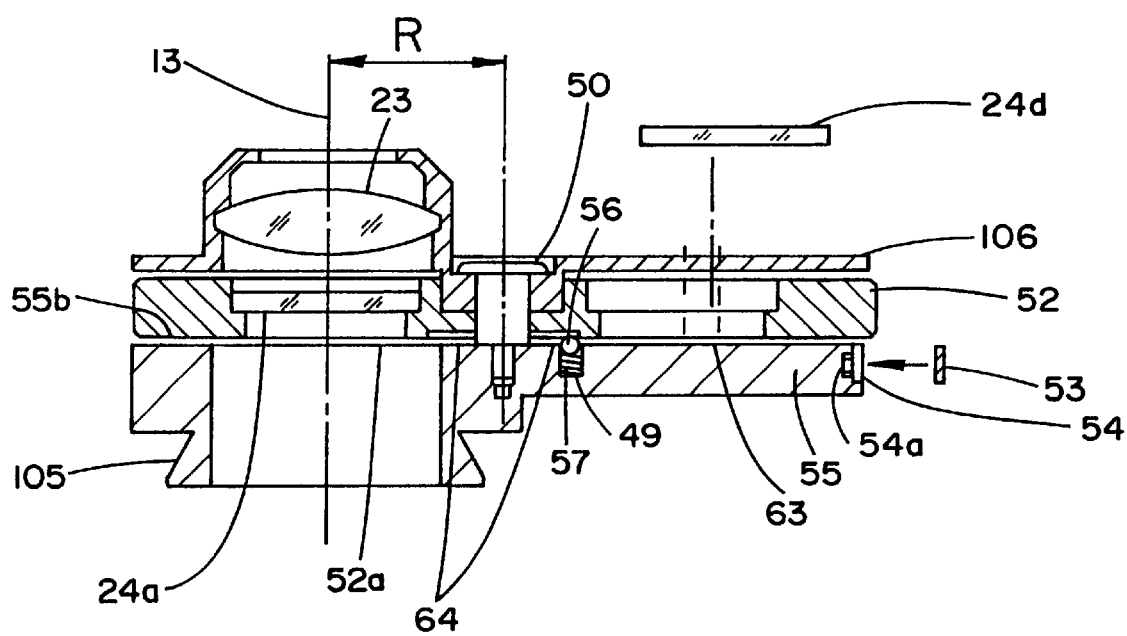
FIG. 14 is a sectional view as viewed along line 14—14 in FIG. 13.

FIG. 14 is a sectional view taken along line 14—14 in FIG. 13. The condenser 07 comprises a bottom section 55 with the attachment male dovetail 105; a turret section 52 as a rotatably movable member; and an upper section 106 with a lens 23.

The turret section 52 and the upper section 106 are attached to the bottom section 55 by means of a rotary shaft 50. The turret section 52 is formed of a thin cylindrical member, which has, in a circle with radius R, four stepped sections 63 into which four ring slits 24a–24d are fitted. The turret section 52 can rotate about the rotary shaft 50. The upper section 106 is fixed to the rotary shaft 50 and to the bottom section 55, and is not rotatable. The rotary shaft 50 is parallel to the optical axis 13 and separated therefrom by a distance R. In an inner surface 55b of the bottom section 55, a hole 49, which is preferably not a through hole, is formed on a line intersecting the optical axis 13 and the rotary shaft 50. A spring 57 and a ball 56 are inserted in the hole 49.

In a bottom surface 52a of the turret section 52, four V-grooves 64 each having a V-shaped cross section are formed on respective lines passing through the center points of the four stepped sections 63 and the rotary shaft 50. Since the inner surface 55b of the bottom section 55 is adjacent to the bottom surface 52a of the turret section 52, the ball 56 normally urges the bottom surface 52a of the turret section 52. Where the tip of one of the V-grooves 64 is aligned with the center of the hole 49 of the bottom section 55 as the turret section 52 rotates, the spring 57 expands to its maximum, and therefore the turret section 52 stabilizes in position. In other words, in four positions in which the axes of the four ring slits 24a–24d are aligned with the optical axis 13, the turret section 52 is positioned by this click mechanism. Each ring slit 24a–24d is projected, via the lens 23, on the back focal plane of the objective lens 21 (see FIG. 2).

In the following description, the positional relationship between the elements viewed from an operation surface 55a of the turret section 52 is explained, in which the direction of the optical axis 13 is referred to as the vertical direction.

The operation surface 55a of the bottom section 55 is provided with a recess 54 in which four type-display members 53a–53d can be arranged horizontally. Each of the type-display members 53a–53d has an abbreviation such as PH10 and PH20 printed thereon for indicating the type of the corresponding ring slit 24a–24d to be selected in accordance with the type of the objective lens 21. The type-display members 53a–53d can be easily attached to the recess 54 by forming one of the recess 54 or each type-display member 53a–53d of a magnet, and the other of a magnetic member. In this embodiment, a magnet 54a is embedded in the bottom of the recess 54, and each type-display member 53a–53d is formed of a magnetic member.

Figure 15:
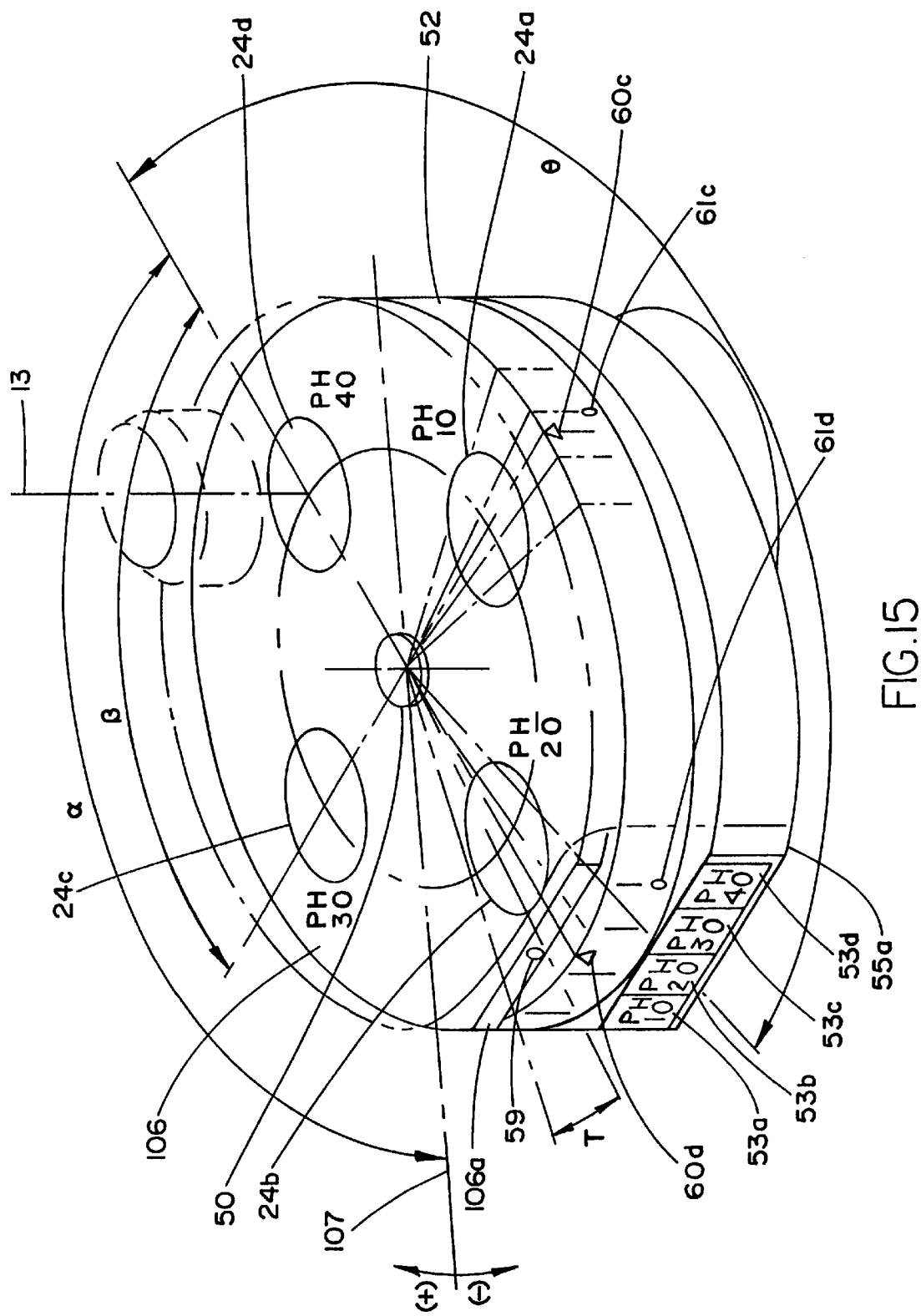
FIG. 15 is a perspective view showing the positional relationship between type-display members and indicators of the second embodiment.

As shown in FIG. 15, a fixed indicator 59 is printed on an operation surface 106a of the upper section 106. Further, four position indicators 60a–60d and four type indicators 61a–61d are printed on a side surface of the turret section 52.

Each of the position indicators 60a–60d is positioned in an upper portion of the intersection line of the circumferential surface of the turret section 52 with the plane including the center axis of the corresponding ring slit 24a–24d and the rotary shaft 50 of the turret section 52.

The position of each type indicator 61a–61d will now be described. First, a reference line 107, with respect to which the upper surface of the turret section 52 is symmetrical, is provided. Suppose that the clockwise direction and the counterclockwise direction are the "+" direction and the "−" direction, respectively, when the turret section 52 is viewed from the above. Further, let the angle between the center of each ring slit 24a–24d and the reference line 107 be α, the angle between two adjacent ring slits 24a–24d be β, and the angle between two adjacent type-display members 53a–53d be γ. In light of the fact that the angle between the optical axis 13 and the center of the display section 55a is 180, the angle θ between the center of each ring slit 24a–24d and the center of the corresponding type-display member 53a–53d is given by $$\theta = 180° + \alpha \times \gamma / \beta$$

For example, in the FIG. 15 case, since α=−135°, β=90° and γ=10°, θ is:

$$\theta = 180° + (-135°) \times 10°/90° = 165°$$

In operation, when the turret section 52 is rotated and the ball 56 is received in one of the V-grooves 64, the turret section 52 is correctly positioned. This can be visually recognized since a corresponding position indicator 60a–60d in the upper portion of the side surface of the turret section 52 is aligned with the fixed indicator 59 above the position indicator 60a–60d. The type of the presently positioned ring slit 24a–24d can be recognized from the corresponding type-display member 53a–53d pointed at by one of the type indicators 61a–61d on the side surface of the turret section 52.

Figure 16:
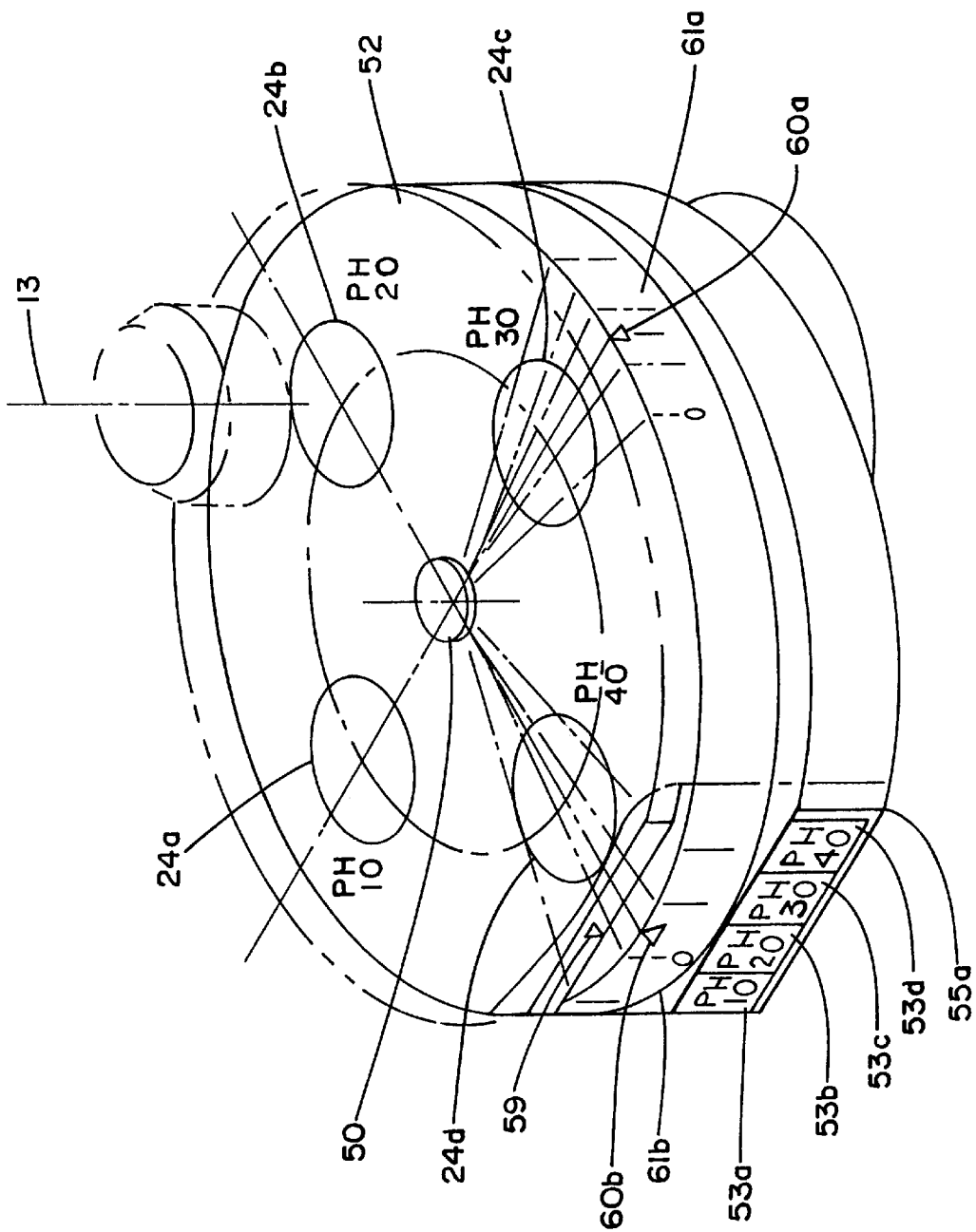
FIG. 16 a view showing the state in which switching to an optical unit PH20 has been finished.
Figure 17:
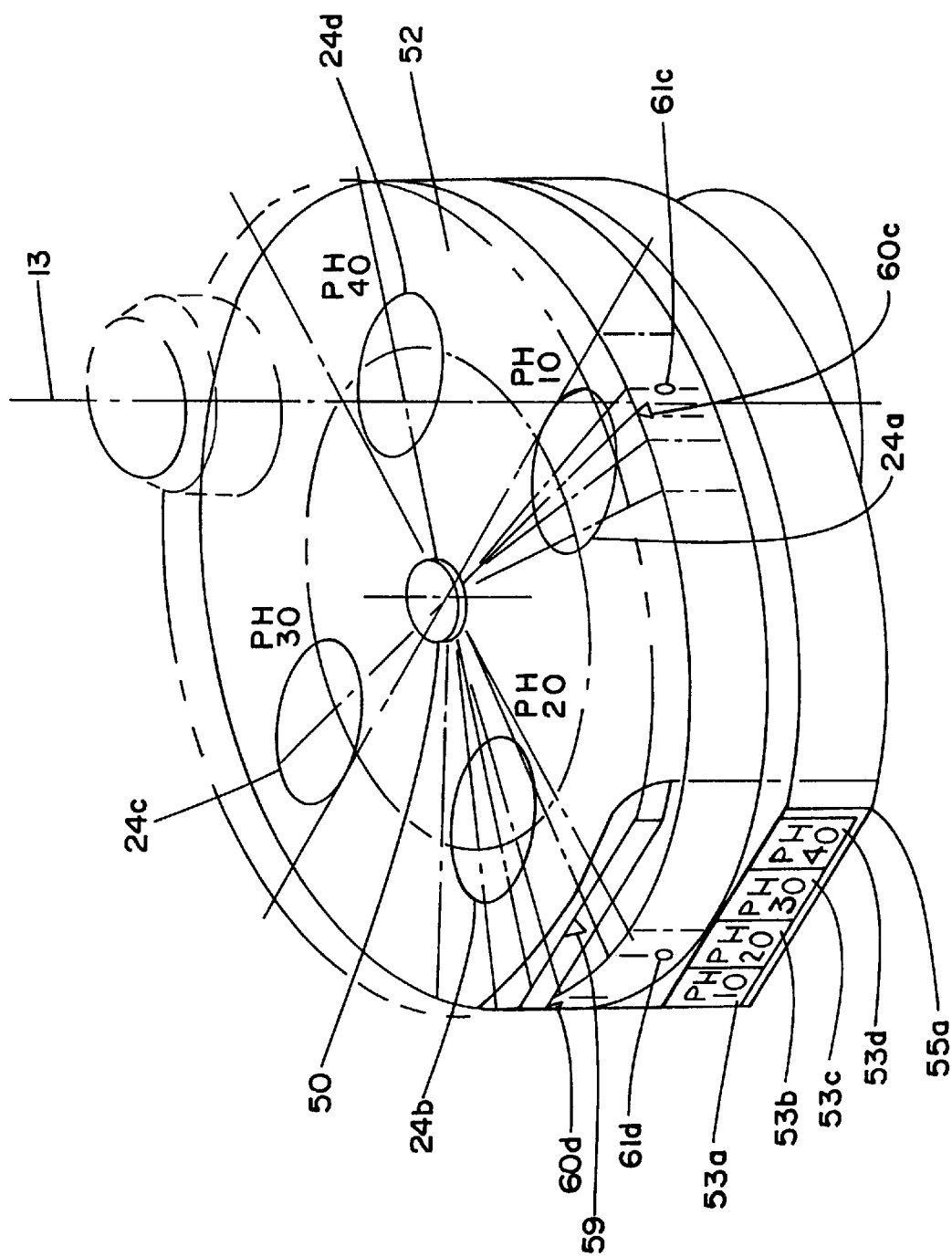
FIG. 17 a view showing a state in which switching to an optical unit is being performed.

To switch the presently-used ring slit 24a–24d to a targeted one in order to change the observation method, the direction and amount of rotation of the turret section 52 can be determined from the positional relationship between the type-display member 53a–53d presently aligned with the type indicator 61a–61d, and the type-display member 53a–53d corresponding to the targeted ring slit 24a–24d. Even during the rotation of the turret section 52, the type indicator 61a–61d may be situated above the type-display member 53a–53d indicative of the targeted ring slit 24a–24d while the position indicator 60a–60d is not aligned with the fixed indicator 59. In this case, it can be recognized that the targeted ring slit 24a–24d has not been positioned and that the switching operation is now being performed. FIG. 17 shows a state during switching from the state shown in FIG. 15, in which PH40 is selected, to the state shown in FIG. 16, in which the switching to PH20 has been finished.

In the rotatable optical unit switching apparatus constructed as above, only one display section enables recognition of the types of all optical units mounted, the type of that one of the optical units which is now positioned on the optical path, and the direction and amount of rotation of a member for switching the optical units from one to a targeted one. Thus, the optical unit switching apparatus is highly operable.

Further, since the optical unit switching apparatus is of a rotary type, the direction which enables minimum movement can be recognized.

In addition, the optical unit switching apparatus is constituted by a small number of component parts, and hence can be manufactured in a reliable manner at low cost.

Figure 18:
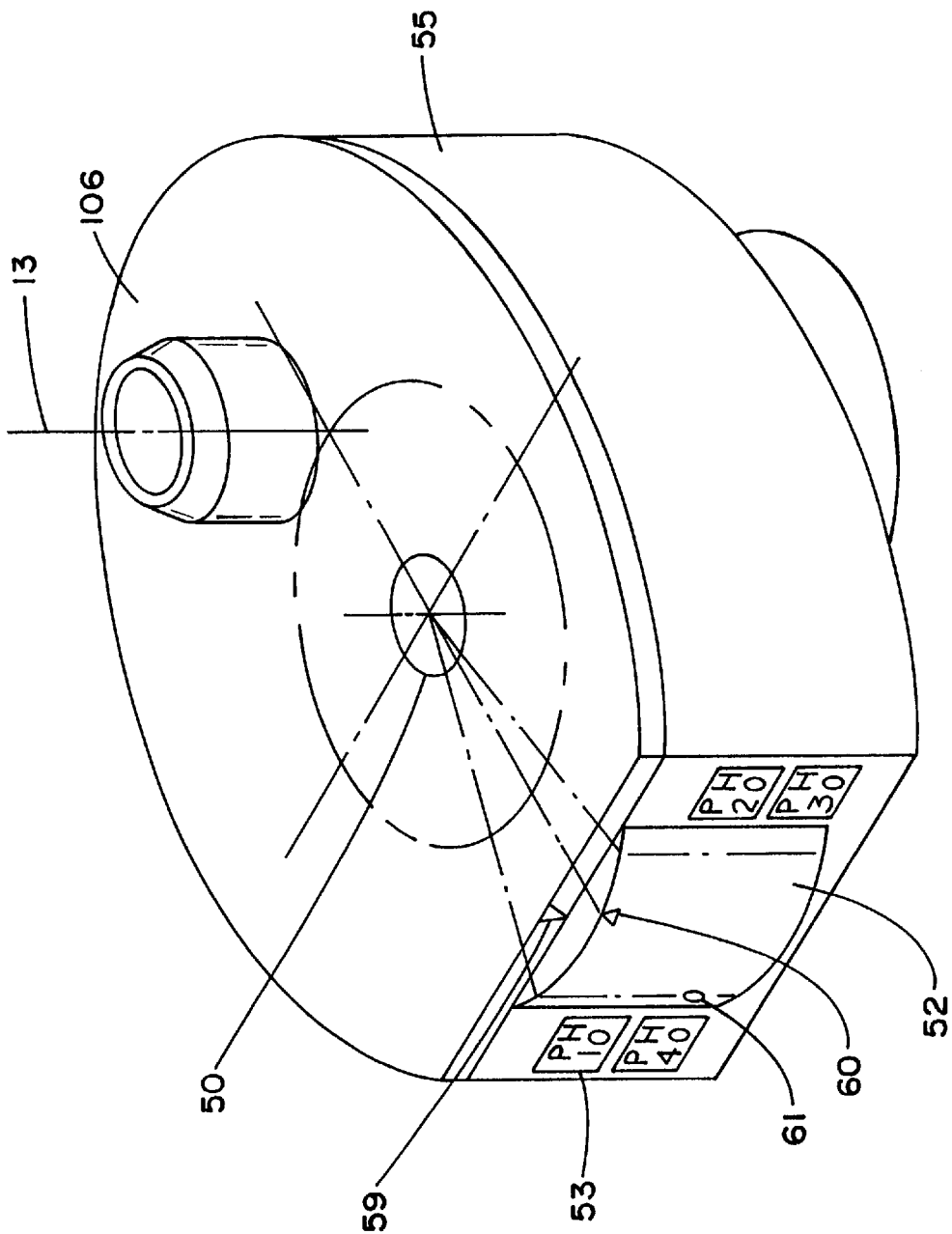
FIG. 18 is a perspective view of a modification of the second embodiment.

The optical unit switching apparatus of the second embodiment may be modified as shown in FIG. 18, in which the type-display members are not arranged in a row. If the direction of rotation can be related to the display members, the same advantages as those of the embodiment of FIG. 13 can be obtained.

Figure 19:
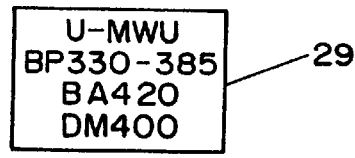
FIG. 19 is a view of a modified type-display member.

FIG. 19 shows a modified type-display member 29. Not only an abbreviation of the filter cassette 19 but also its optical characteristic values are printed on the type-display member 29.

"U-MWU" in the first line represents the name of the filter cassette used for DAPI fluorochrome for marking DNA (the A-T range of the nucleic acid), and the like. The excitation wavelength of the DAPI fluorochrome is 372 nm and the peak of the fluorescence wavelength is 456 nm. The second to fourth lines represent by wavelengths the characteristics of the excitation filter, the absorption filter and the dichroic mirror in the filter cassette.

Since the characteristics are indicated, it can be recognized at a glance which filter cassette should be used when the characteristics of the fluorochrome are known. Thus, the optical unit switching apparatus can be used more easily.

Figure 20A:
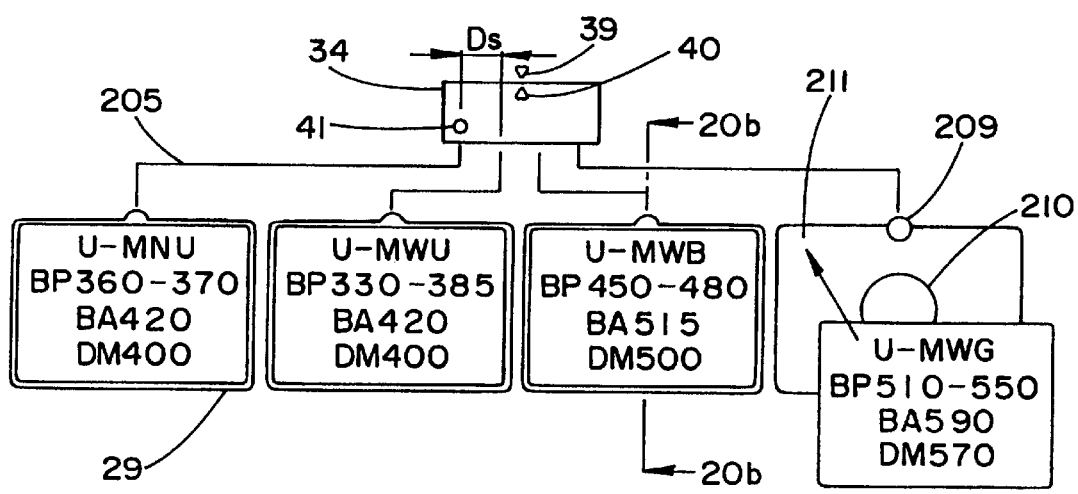
FIG. 20(*a*) is a view of a modified type-display section.
Figure 20B:
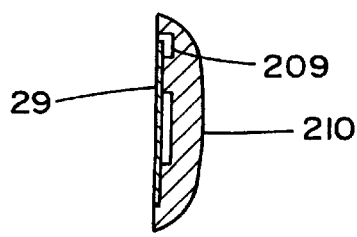

FIGS. 20(a) and 20(b) show a modified type-display section of the operation surface 30a. Leader lines 205 are employed when large type-display members 29 are used, that is, when the characters in the type-display member 29 are large or when many characters are needed, for example, to indicate the optical characteristic values. The operation surface 30a is provided with four recesses 211 which are slightly larger than the type-display members 29. A hole 209 is formed on the upper side of each recess 211, and a magnet 210 is embedded in the center of the bottom of each recess 211. The type-display member 29 is made of a magnetic material. When fitted in the recess 211, the type-display member 29 is attracted and fixed by the magnet 210. The type-display member 29 can be easily removed by inserting a pointed member, such as a pen point, into the hole 209 and moving the type-display member 29 forward.

In this case, Ds in the following equation:

$$Dx = (Dy/Df) \times Ds$$

explained in the first embodiment is the distance (pitch) between the upper portions of two adjacent leader lines 205, as shown in FIG. 20(a).

Figure 21A:
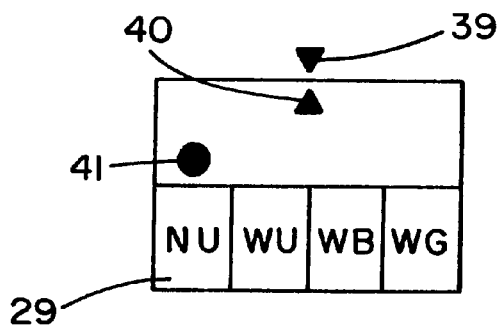
FIGS. 21(*a*) and 21(*b*) are views of modified indicators.
Figure 21B:
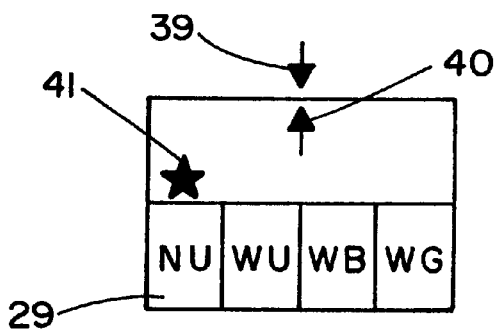

FIGS. 21(a) and 21(b) show other modified type-display sections of the operation surface 30a. As the indicators 39, 40 and 41, the marks ●, ★, and ↓ are used instead of the mark ○, thereby enhancing their visibility.

FIG. 22 shows a modified filter cassette 19, which has a receiving portion of a type-display member 29. The filter cassette 19 is provided in its upper surface with a recess 207 for receiving the type-display member 29 corresponding to the filter cassette 19. A magnet 207a is embedded in the bottom of the recess 207. When the filter cassette 19 is removed from the movable member 31, the type-display member 29 may be fitted into the recess 207, so that the type-display member 29 can be prevented from being lost.

This invention is also applicable to a device in which optical units are fixed to (i.e., unremovable from) a moving member. In this case, type-display members need not be separated from the main body of the optical unit switching apparatus: abbreviations indicating the types of filter cassettes may be printed directly on the main body.

The optical unit switching apparatus according to the present invention has the advantage that the types of presently mounted optical units, the type of the optical unit presently positioned on the optical path, and the direction and amount of movement to switch the optical unit to a targeted one can be easily and directly recognized with a simple structure using a single display section. Accordingly, the switching operation can be performed easily.

What is claimed is:

1. An optical unit switching apparatus for switching a plurality of optical units in a microscope by using a plurality of type-display members corresponding to the plurality of optical units for distinguishing the plurality of optical units, the apparatus comprising:

a movable member having mounting positions for mounting the plurality of optical units;

a main body for rectilinearly-movably supporting the movable member in order to selectively insert one of the plurality of optical units into an optical path of the microscope and remove the one optical unit from the optical path;

a positioning mechanism for positioning the movable member so as to align one of the plurality of optical units with the optical path of the microscope;

a type-display member arranging section located in the main body for arranging the plurality of type-display members adjacent to each other along a rectilinearly moving direction of the movable member; and a plurality of indicators arranged corresponding to the respective mounting positions of the movable member for indicating one of the plurality of type-display members which corresponds to one of the plurality of optical units which is inserted into the optical path of the microscope, wherein an arranging pitch of any adjacent two of the plurality of type-display members arranged in the type-display member arranging section is smaller than a mounting pitch of any adjacent two of the plurality of optical units mounted in the mounting positions of the movable member, and wherein the plurality of indicators are displaced, in the rectilinearly moving direction of the movable member, from centers of the corresponding mounting positions of the movable member by respective predetermined distances which are different from each other, whereby one of the plurality of indicators indicates one of the plurality of type-display members which corresponds to one of the plurality of optical units which is inserted into the optical path of the microscope.

2. The apparatus of claim 1, in which the type-display member arranging section has a width which is not larger than a width of any one of the plurality of the optical units.

3. The apparatus of claim 2, in which the predetermined distance Dx of each of the plurality of indicators is given by the following equation:

$$Dx=(Dy/Df) \times Ds$$

where Dy is a distance between the center of the corresponding mounting position and a center of the movable member, Df is the width of each of the plurality of optical units, which is equal to the mounting pitch of any adjacent two of the plurality of optical units, and Ds is a width of each of the plurality of type-display members, which is equal to the arranging pitch of any adjacent two of the plurality of type-display members.

4. The apparatus of claim 1, further comprising a plurality of markings which are arranged at respective positions to be indicated by the plurality of indicators and are related to the corresponding type-display members, whereby the plurality of indicators indicate the corresponding type-display members indirectly by indicating the corresponding markings.

5. The apparatus of claim 1 further comprising: a fixed indicator arranged to the main body; and a plurality of movable indicators arranged to the movable member for aligning with the fixed indicator when the movable member is positioned by the positioning mechanism.

6. The apparatus of claim 1, in which the plurality of type-display members are nameplates on which names of the corresponding optical units are indicated.

7. The apparatus of claim 1, further comprising magnetic attracting means for attaching the plurality of type-display members to the type-display member arranging section.

8. The apparatus of claim 1, in which each of the plurality of optical units is a filter cassette including an excitation filter, a dichroic mirror, and an absorption filter.

9. The apparatus of claim 1, wherein the positioning mechanism is a click mechanism comprising:

a plurality of grooves located on a surface of the movable member, each groove corresponding to one of the plurality of optical units;

a ball opposing the grooves and disposed on the main body; and a spring for biasing the ball towards the grooves such that when the ball engages a groove, the optical unit corresponding to the engaged groove is aligned with the optical path of the microscope.

10. The apparatus of claim 1, in which the plurality of optical units have the same width and the same mounting pitch, and in which the plurality of type-display members have the same width and the same arranging pitch.

11. An optical unit switching apparatus for switching a plurality of optical units in a microscope by using a plurality of type-display members corresponding to the plurality of optical units for distinguishing the plurality of optical units; the apparatus comprising:

a movable member having mounting positions for mounting the plurality of optical units;

a main body for rotatably supporting the movable member in order to selectively insert one of the plurality of optical units into an optical path of the microscope and remove the one optical unit from the optical path;

a positioning mechanism for positioning the movable member so as to align one of the plurality of optical units with the optical path of the microscope;

a type-display member arranging section located in the main body for arranging the plurality of type-display members adjacent to each other along a rotating direction of the movable member; and a plurality of indicators arranged corresponding to the respective mounting positions of the movable member for indicating one of the plurality of type-display members which corresponds to one of the plurality of optical units which is inserted into the optical path of the microscope, wherein an arranging pitch of any adjacent two of the plurality of type-display members arranged in the type-display member arranging section is smaller than a mounting pitch of any adjacent two of the plurality of optical units mounted in the mounting positions of the movable member, and wherein the plurality of indicators are displaced, in the rotating direction of the movable member, from centers of the corresponding mounting positions of the movable member by respective predetermined distances which are different from each other, whereby one of the plurality of indicators indicates one of the plurality of type-display members which corresponds to one of the plurality of optical units which is inserted into the optical path of the microscope.

12. The apparatus of claim 11, in which the type-display member arranging section has a width which is not larger than the mounting pitch of any adjacent two of the plurality of the optical units.

13. The apparatus of claim 11, further comprising a plurality of markings which are arranged at respective positions to be indicated by the plurality of indicators and are related to the corresponding type-display members.

14. The apparatus of claim 11, further comprising:

a fixed indicator arranged to the main body; and a plurality of movable indicators arranged to the movable member for aligning with the fixed indicator when the movable member is positioned by the positioning mechanism.

15. The apparatus of claim 11, in which the plurality of type-display members are nameplates on which names of the corresponding optical units are indicated.

16. The apparatus of claim 11, further comprising magnetic attracting means for attaching the plurality of type-display members to the type-display member arranging section.

17. The apparatus of claim 11, in which each of the plurality of optical units is a ring slit.

18. The apparatus of claim 11, wherein the positioning mechanism is a click mechanism comprising:
- a plurality of grooves located on a surface of the movable member, each groove corresponding to one of the plurality of optical units;
- a ball opposing the grooves and disposed on the main body; and
- a spring for biasing the ball towards the grooves such that when the ball engages a groove, the optical unit corresponding to the engaged groove is aligned with the optical path of the microscope.

19. The apparatus of claim 11, in which the plurality of optical units have the same width and the same mounting pitch, and in which the plurality of type-display members have the same width and the same arranging pitch.

20. An optical unit switching apparatus for switching a plurality of optical units in an optical device, the apparatus comprising:
- a movable member having mounting positions for mounting the plurality of optical units;
- a main body for movably supporting the movable member in order to selectively insert one of the plurality of optical units into an optical path of the optical device and remove the one optical unit from the optical path;
- a positioning mechanism for positioning the movable member so as to align one of the plurality of optical units with the optical path;
- a type-display section having a plurality of displays corresponding to the plurality of optical units for displaying types of the plurality of optical units; and
- a plurality of indicators arranged corresponding to the respective mounting positions of the movable member for indicating one of the plurality of displays which corresponds to one of the plurality of optical units inserted into the optical path, respective positions of the plurality of indicators with respect to centers of the corresponding mounting positions being different from each other,
- wherein a pitch of any adjacent two of the plurality of displays of the type-display section is smaller than a mounting pitch of any adjacent two of the plurality of optical units mounted in the mounting positions of the movable member.

21. An optical unit switching apparatus for switching a plurality of optical units in a microscope by using a plurality of type-display members corresponding to the plurality of optical units for distinguishing the plurality of optical units, the apparatus comprising:
- a movable member having mounting positions for mounting the plurality of optical units;
- a main body for rectilinearly-movably supporting the movable member in order to selectively insert one of the plurality of optical units into an optical path of the microscope and remove the one optical unit from the optical path;
- a positioning mechanism for positioning the movable member so as to align one of the plurality of optical units with the optical path of the microscope;
- a type-display member arranging section located in the main body for arranging the plurality of type-display members adjacent to each other along a rectilinearly moving direction of the movable member; and
- a plurality of indicators arranged corresponding to the respective mounting positions of the movable member for indicating one of the plurality of type-display members which corresponds to one of the plurality of optical units which is inserted into the optical path of the microscope;
- wherein respective positions of any two of the plurality of indicators with respect to centers of the corresponding mounting positions of the movable member differ by a distance between centers of the corresponding type-display members arranged in the type-display member arranging section and each of the plurality of indicators is displaced by a distance Dx from a center of the corresponding mounting position, the distance Dx being given by the following equation:

$$Dx = (Dy/Df) \times Ds$$

where Dy is a distance between the center of the corresponding mounting position and a center of the movable member, Df is a width of each of the plurality of optical units, and Ds is a width of each of the plurality of type-display members.

22. An optical unit switching apparatus for switching a plurality of optical units in a microscope by using a plurality of type-display members corresponding to the plurality of optical units for distinguishing the plurality of optical units, the apparatus comprising:
- a movable member having mounting positions for mounting the plurality of optical units;
- a main body for rectilinearly-movably supporting the movable member in order to selectively insert one of the plurality of optical units into an optical path of the microscope and remove the one optical unit from the optical path;
- a positioning mechanism for positioning the movable member so as to align one of the plurality of optical units with the optical path of the microscope;
- a type-display member arranging section located in the main body for arranging the plurality of type-display members adjacent to each other along a rectilinearly moving direction of the movable member;
- a plurality of indicators arranged corresponding to the respective mounting positions of the movable member for indicating one of the plurality of type-display members which corresponds to one of the plurality of optical units which is inserted into the optical path of the microscope; and
- a fixed indicator arranged to the main body; and a plurality of movable indicators arranged to the movable member for aligning with the fixed indicator when the movable member is positioned by the positioning mechanism.

23. An optical unit switching apparatus for switching a plurality of optical units in a microscope by using a plurality of type-display members corresponding to the plurality of optical units for distinguishing the plurality of optical units; the apparatus comprising:
- a movable member having mounting positions for mounting the plurality of optical units;
- a main body for rotatably supporting the movable member in order to selectively insert one of the plurality of optical units into an optical path of the microscope and remove the one optical unit from the optical path;

a positioning mechanism for positioning the movable member so as to align one of the plurality of optical units with the optical path of the microscope;

a type-display member arranging section located in the main body for arranging the plurality of type-display members adjacent to each other along a rotating direction of the movable member;

a plurality of indicators arranged corresponding to the respective mounting positions of the movable member for indicating one of the plurality of type-display members which corresponds to one of the plurality of optical units which is inserted into the optical path of the microscope; and a fixed indicator arranged to the main body; and a plurality of movable indicators arranged to the movable member for aligning with the fixed indicator when the movable member is positioned by the positioning mechanism.

24. An optical unit switching apparatus for switching a plurality of optical units in a microscope by using a plurality of type-display members corresponding to the plurality of optical units for distinguishing the plurality of optical units, the apparatus comprising:

a movable member having mounting positions for mounting the plurality of optical units and a rotating axis;

a main body for rotatably supporting the movable member in order to selectively insert one of the plurality of optical units into an optical path of the microscope and remove the one optical unit from the optical path;

a positioning mechanism for positioning the movable member so as to align one of the plurality of optical units with the optical path of the microscope;

a type-display member arranging section located in the main body for arranging the plurality of type-display members adjacent to each other along a rotating direction of the movable member; and a plurality of indicators arranged corresponding to the respective mounting positions of the movable member for indicating one of the plurality of type-display members which corresponds to one of the plurality of optical units which is inserted into the optical path of the microscope, wherein the optical path of the microscope is on the opposite side from the type-display member arranging section with respect to the rotating axis of the movable member, wherein an arranging pitch angle $\gamma$ of the plurality of type-display members arranged in the type-display member arranging section is smaller than a mounting pitch angle $\beta$ of the plurality of optical units mounted in the mounting positions of the movable member, wherein an angle $\theta$ between a center of each of the mounting positions and a center of the corresponding type-display member is given by the following equation:

$$\theta = 180° + (\alpha \cdot \gamma / \beta)$$

where $\alpha$ is an angle between the center of each of the mounting positions and a reference position, whereby one of the plurality of indicators indicates one of the plurality of type-display members which corresponds to one of the plurality of optical units which is inserted into the optical path of the microscope.

\* \* \* \* \*